Nov. 21, 1933.                W. G. CHRYST                1,936,047
                              HACK SAW MACHINE
                           Filed Sept. 13, 1930      6 Sheets-Sheet 1

WITNESS:                                              INVENTOR
                                                    William G. Chryst
                                                                  BY
                                                        HIS ATTORNEY

Nov. 21, 1933.　　　W. G CHRYST　　　1,936,047
HACK SAW MACHINE
Filed Sept. 13, 1930　　6 Sheets-Sheet 3

WITNESS:

INVENTOR
William G. Chryst
BY
HIS ATTORNEY

Nov. 21, 1933.                    W. G. CHRYST                    1,936,047
                                HACK SAW MACHINE
                            Filed Sept. 13, 1930            6 Sheets-Sheet 4

WITNESS:                                                    INVENTOR
                                                        William G. Chryst
                                                            BY
                                                                HIS ATTORNEY Nov. 21, 1933.  W. G. CHRYST  1,936,047
HACK SAW MACHINE
Filed Sept. 13, 1930    6 Sheets-Sheet 5

Patented Nov. 21, 1933

1,936,047

UNITED STATES PATENT OFFICE 1,936,047

HACK SAW MACHINE

William G. Chryst, Philadelphia, Pa.

Application September 13, 1930
Serial No. 481,718

18 Claims. (Cl. 29—73)

This invention relates to hack saw machines, and has for an object to provide a machine wherein the operating structure is automatically adjusted in consonance with the work presented.

A further object of the invention is to provide a hack saw machine embodying a vise, for holding the work, with improved means, adjustable from the setting of the vise, to regulate the travel of the saw.

A further object of the invention is to provide a hack saw machine, embodying a work holding vise, with improved means, operable from the structure employed for setting the vise, to impart to the saw different amplitudes of travel, in accordance with the size of the work presented.

A further object of the invention is to provide in a hack saw machine, a work holding vise, and improved structure, actuated from the setting of the vise, for imparting to the saw different speeds of travel, in accordance with the work presented.

A further object of the invention is to provide in a hack saw machine, improved means for varying the speed.

A further object of the invention is to provide in a hack saw machine, improved means for holding the saw in an accurately vertical position, to insure accurately vertical cutting, upon the work presented.

A further object of the invention is to provide in a hack saw machine, improved means for providing a slow motion of the saw during the cutting stroke, and a rapid movement of the saw, on the return stroke.

It is well known, that hack saw machines, at present in use, are so constructed that the saw departs from absolute accuracy of travel, and the present invention, therefore, is aimed at means to overcome this shortcoming. It is also well known, that such saw machines tend to drag the saw on the return, or non-cutting stroke, whereby the teeth of the saw are broken by the contact with the work and the removed particles of steel, and it is the object of the present invention to provide a machine wherein the tension upon the work, so employed for cutting, is relieved during the return stroke sufficiently to prevent the breakage of saw teeth.

In accordance with the present invention, therefore, the hack saw machine comprises a reciprocating hack saw frame, with improved hydraulic means for feeding the saw to its work, and automatically return the saw to initial position, when the saw operation is completed, to relieve the saw from dragging upon the work during the return stroke, to provide means for automatically increasing or decreasing the amplitude of travel of the saw, in accordance with the work, and to increase or decrease the rate of travel of the saw also in accordance with the size of the work, and to provide structural features for carrying forward the objects.

The invention is directed to other objects and possesses other features of novelty and advantage, some of which, together with the foregoing, will be hereinafter more fully set forth.

In the drawings.

Like characters of reference indicate corresponding parts throughout the several views.

The improved hack saw, which forms the subject matter of this application, comprises a base 20, upon which, the several structural features are erected. Upon this base 20, various members are erected for supporting various mechanical parts. In the drawings, these instrumentalities are, in part, shown as supported by the sides 21, which also form a housing, but it is to be understood, that other types of supporting structures are fully within the scope of the present invention.

Figure 1:
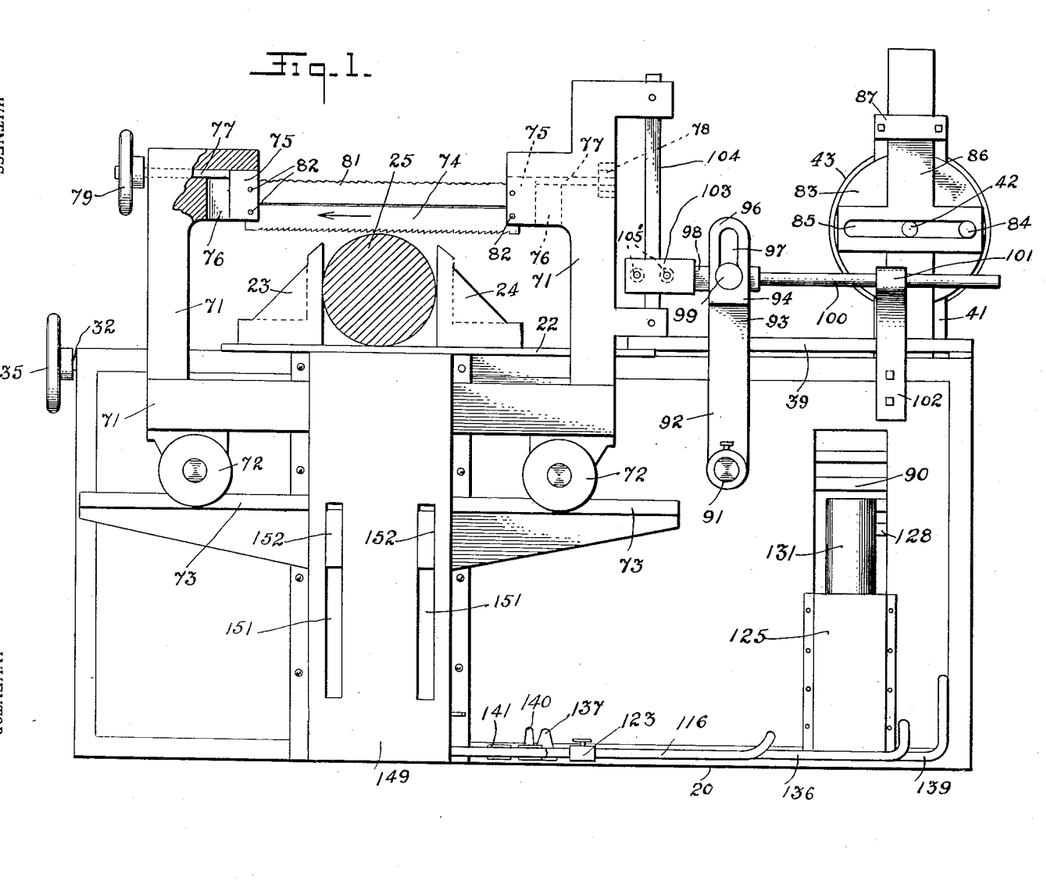
Figure 1 is a view of the machine in side elevation, parts being broken away.
Figure 2:
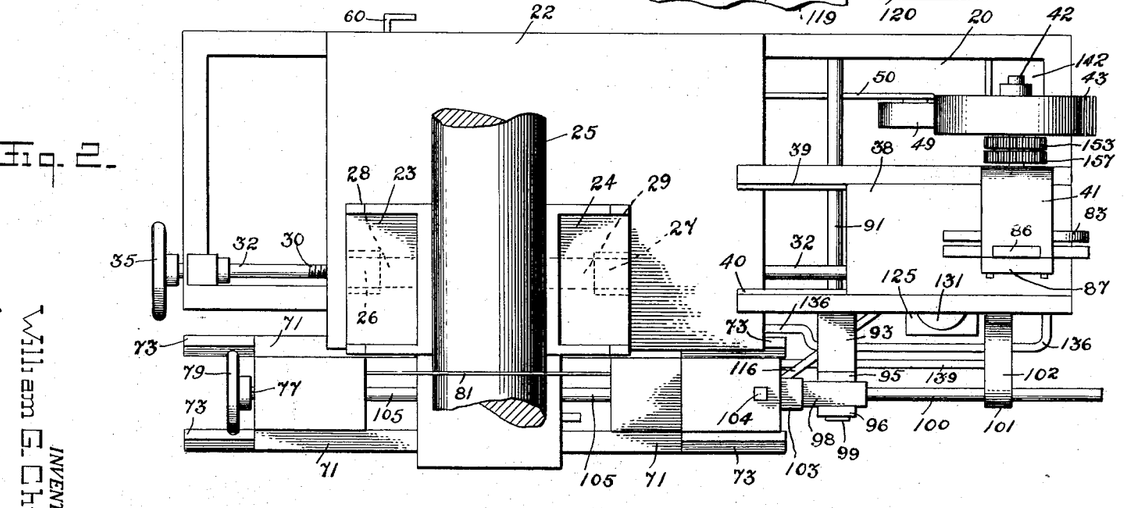
Figure 2 is a top plan view of the machine.

Erected upon the supporting structure, is a table 22, and thereon, are mounted to slide the jaw members 23 and 24, constituting the vise for holding the work, indicated at 25 in Figures 1 and 2. These jaws 23 and 24, have nuts 26 and 27 respectively, which extend downwardly through slots, indicated in dotted lines at 28 and 29, through the table 22. These nuts 26 and 27 are engaged by the reverse threads 30 and 31, of the shaft 32, which is journaled in bearings 33 and 34. The said shaft 32, is provided with a hand wheel 35, for rotating the shaft and accomplishing the adjustment of the jaws to clamp the work 25.

The shaft 32 is also provided with a threaded portion 36, which engages a nut 37, attached to the plate 38. The plate 38 is mounted to slide in the guideways 39 and 40, so that this plate 38 is automatically adjusted in consonance with the movement of the jaws 23 and 24 of the vise.

Erected upon this plate 38, is a supporting structure 41, forming a journal for a shaft 42, upon which is loosely mounted, a pulley 43. The pulley 43 receives power through the belt 44, from the pulley 45, which is mounted upon a shaft 46, journaled at 47 and 48 in the supporting structure. A belt tightener 49, is carried by an arm 50, fulcrumed upon the shaft 46 so that, irrespective of the position of the pulley 43, relative to the pulley 45, sufficient tension is provided by the belt tightener 49 to insure traction.

Mounted also upon the shaft 46, is a cone 51, and a second cone 52 is spaced from the cone 51, and carried upon a shaft 53, journaled in the supporting structure at 54 and 55.

For driving the cone 52, and therefore the mechanism of the present invention, a motor, shown conventionally at 56 is provided. The arbor 57 of the motor, carries stepped gears 58, and the cone shaft 53, carries inter-geared stepped gears 59. A sliding key structure, indicated by the bar 60, serves to connect any one of the stepped gears 58 with the arbor 57 to therefore drive the shaft 53, and the cone 52 at different speeds, relative to the speed of the motor, and to be manually adjusted for the purpose hereinafter mentioned.

Figures 3, 11:
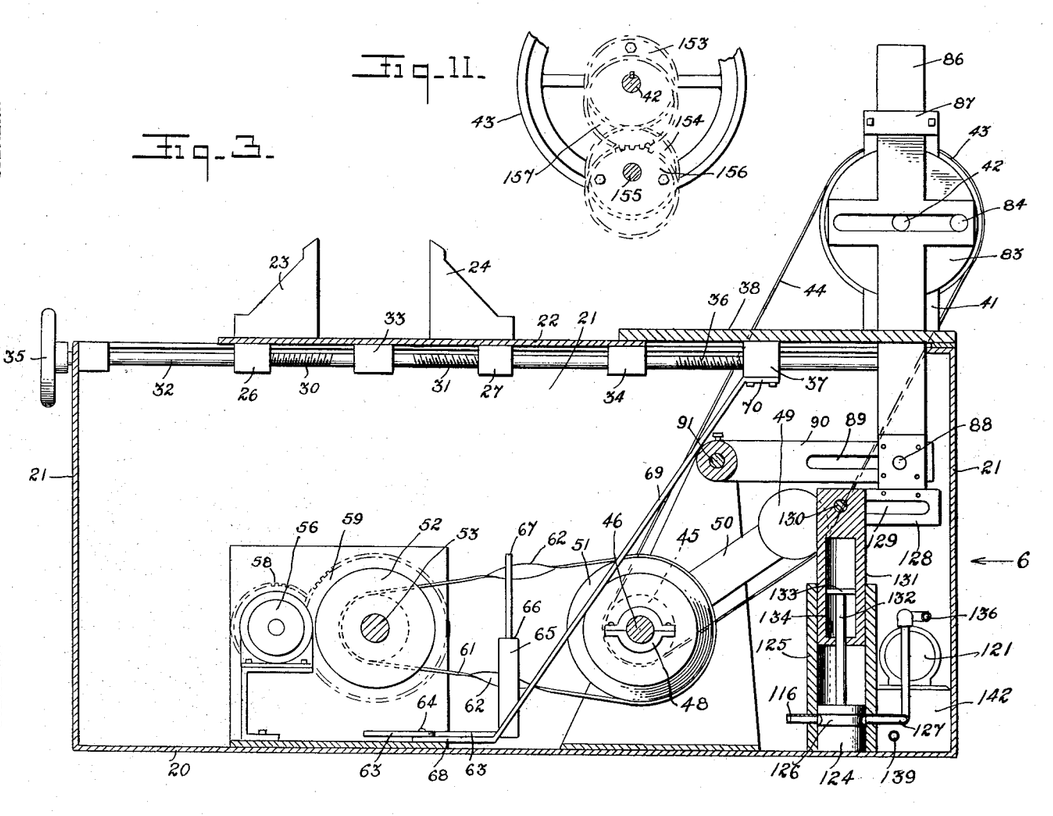
Figure 3 is a view of the mechanism contained within the housing, such housing being removed, together with some parts of the mechanical structure.
Figure 11 is a detail view of the quick return mechanism.
Figures 4, 7, 9, 10:
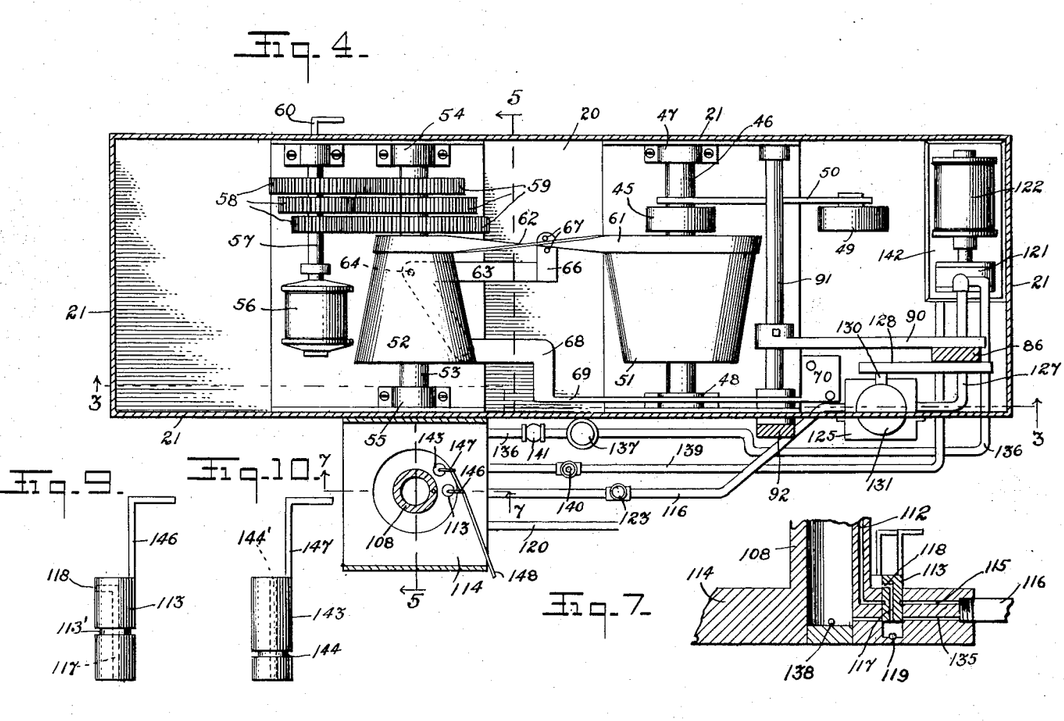
Figure 4 is a view taken on a horizontal plane, with some of the structure shown in section.
Figure 7 is a horizontal sectional view taken on line 7—7 of Figure 4, and at right angles to the corresponding parts shown at Figure 5.
Figure 9 is a detail view in side elevation of one of the valves.
Figure 10 is a view in side elevation of another one of the valves.

The cones 51 and 52 are interconnected by a belt 61, which is given a half twist, as indicated at 62 in Figures 3 and 4 so that the geometrical angular draw of the cones 51 and 52 is overcome.

For adjusting this belt longitudinally of the axles of the cones 51 and 52, a belt shipper is employed, comprising a bell crank lever 63, pivoted at 64, with an arm 65 extending upwardly therefrom, having an offset 66, and guide fingers 67, upon the opposite sides of the belt, as is customary in belt shipping devices. For actuating the bell crank lever, and therefore the belt shipper, an arm comprising the parts 68 and 69 is employed, the part 69 extending upwardly to a plate 70, which is attached to the nut 37 and therefore, with the plate 38. It is obvious, therefore, that as the plate 38 moves slidably, the bell crank lever, carrying the belt shipper, will be oscillated to move the shipper in the required directions.

A saw frame 71 is provided with casters 72, traveling upon inverted V-shaped tracks 73, such tracks being spaced apart so that four of said casters 72 travel upon said tracks and maintain the saw frame 71, in an accurately plumb position, irrespective of this longitudinal travel upon said tracks. The saw frame 71, carries a saw 74, which said saw is of the usual and ordinary construction. It is maintained in the saw frame by means of blocks 75, set in recesses 76, in said frame. The blocks 75 have shanks 77, which are screw-threaded, and one is permanently fixed by a nut 78, while a hand wheel 79 controls the other of said blocks so that tension may be applied to the saw, as is customary in the art.

Figures 5, 6:
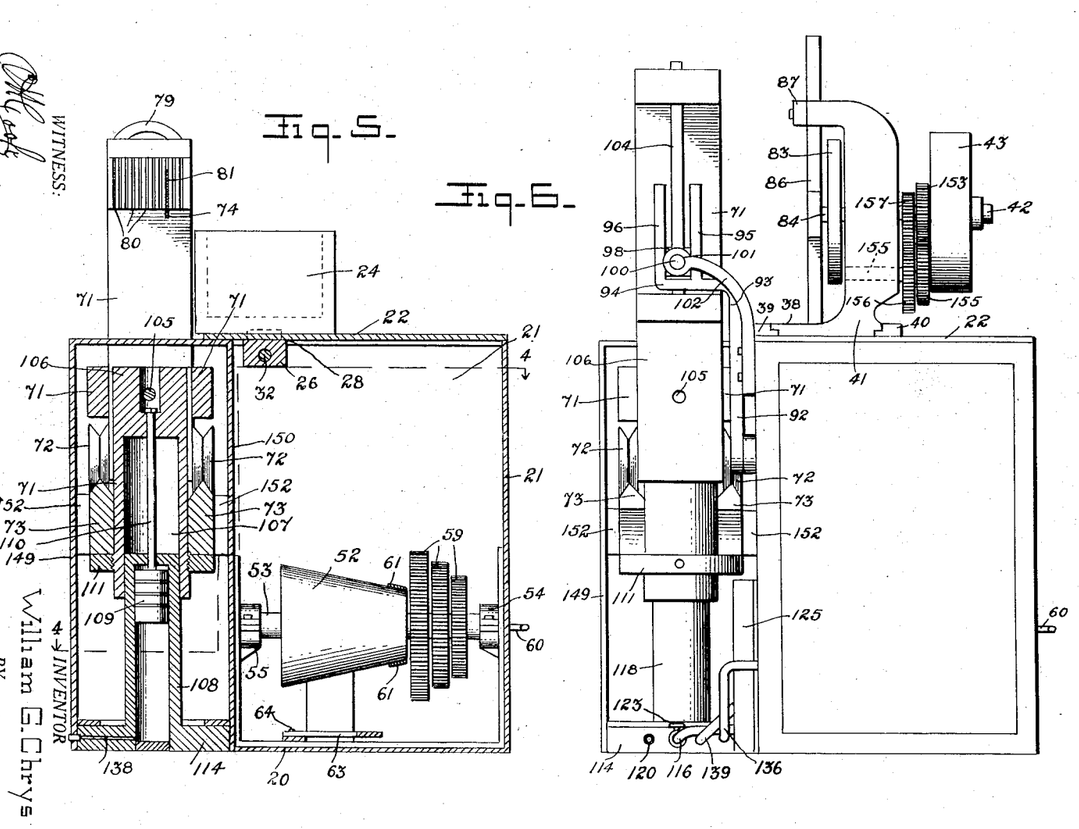
Figure 5 is a vertical section view, taken on line 5—5 of Figure 4, and showing the line 4—4 as the planes of Figure 4.
Figure 6 is an end view of the device from the end indicated by arrow 6 at Figure 3, but with some parts of the housing removed.

The saw frame is provided with a plurality of slits 80 (see Fig. 5) into any one of which, the saw may be inserted, or a plurality of saws may be inserted into all of said slits, or in any of said slits, as may be elected. Preferably also, a follower 81, will likewise be inserted into the same slit and both saw and follower will be secured by pins 82, and both similarly tensioned. It is the intent to employ a worn saw for this follower, although it is not essential, and some other thin sheet of metal may be substituted. This is merely for the purpose of strengthening the saw and preventing breakage.

To reciprocate the saw carriage, upon the tracks 73, a disk 83 is mounted upon the shaft 42 to rotate therewith, and is provided with a wrist pin 84. The wrist pin 84 engages within a slot 85, formed in part in laterally extending arms of the slide 86, which has bearing at 87 and through the plate 38. Adjacent the lower end of the slide 86, a pin 88 is provided which engages a slot 89 in the lever 90. This lever 90, is rigidly attached to a shaft 91, journaled in the supporting structure, and spaced therefrom, is a second lever 92, also rigidly attached to the shaft 91, substantially at right angles to and forming with the lever 90 a bell crank combination. The lever 92 is bent outwardly at 93, to form an offset part 94, continued by spaced upstanding members 95 and 96, which are provided with a slot 97. In the interval between the members 95 and 96, a block 98 is employed with a pintle 99, sliding in the said slot 97.

The block 98, is rigidly attached to a slide bar 100 which slides through the bearing 101 of the bracket 102. At its end, opposite such sliding engagement, the bar 100 is provided with a head 103, vertically slidable relative to the bar 104, carried by the saw frame. At 105' (see Fig. 1), rollers are suggested for partially eliminating friction of this head 103 upon the bar 104. This bar 104, is preferably square, as indicated more particularly at Figures 1 and 2, but the invention is, of course, in no way limited to this form.

The saw carriage 71, is provided also with a slip rod 105, which slides through the block 106 (see Fig. 5) which is positioned between the side rails of the saw frame 71. As the block 106 is fed downwardly, by the organization hereinafter described, the slip rod 105 exerts downward or feeding stress upon the saw frame 71, and therefore upon the saw 74. This block 106 has a bore 107, sliding upon the exterior of the cylinder 108, and a piston 109 is mounted in said cylinder and through the median of the piston rod 110, interconnected with the block 106. Fluid under pressure, admitted to the cylinder 108, coacting with the piston 109, furnishes the tension for the feeding of the saw to its work. This block 106 also carries, rigidly interconnected therewith, the tracks 73 and are preferably supported thereon by means of a nut 111, surrounding the central part of said block beneath said tracks.

The control for the hydraulic pressure in the cylinder 108, is shown more in detail at Figure 7. This comprises a passage 112, which extends vertically within the wall of the cylinder, and communicates therewith at its upper end. This passage 112 is controlled by a slide valve 113. The base 114, which supports the cylinder, is provided with a conduit 115, which is put in communication with the passage 112 by the actuation of the valve 113. In the position shown in Figure 7, the circumferential groove 113' (see Fig. 9), forms communication between the conduits 112 and 115, so that the fluid, under pressure, from the pipe 116, passes through the conduits 115, the circumferential groove 113', the conduit 112, to the top of the cylinder above the piston 109. This valve 113 is provided with an axial bore 117, having an offset 118. When the valve 113 is moved downwardly, the offset 118 is in communication with the conduit 112 so that the fluid within the cylinder 108, above the piston 109, may flow backwardly through this conduit, through the conduit in said valve, to the outlet 119 and discharge through the pipe 120 to any elected receiver.

To provide the pressure on the fluid supplied, as above noted, a pump 121 (see Fig. 4) is driven by a prime mover, indicated by the conventional motor 122. Manual means, as the globe valve 123, is provided for controlling this pressure.

A mechanically operated valve is also employed for controlling the pressure in timed relation, to the reciprocation of the saw frame. This is a valve 124 (see Fig. 3), mounted in the cylinder 125, and having a circumferential groove 126 in communication with the pipe 116. It is also in communication with the pipe 127, which communicates directly with the pump 121. To actuate this valve 124, in timed relation to the reciprocation of the saw frame, an arm 128 is connected with the slide 86, through a slot 129 engaging a pin 130, carried by a slide 131, operating in the cylinder 125. The valve 124 is provided with a stem 132 (see Fig. 3), with a head 133 thereon, the stem passing through the perforate end 134 of the slide 131. When the slide 131 rises to its limit, the perforate end 134 engages the head 133 to lift the valve and remove the circumferential groove 126 from communication between the pipes 116 and 127. When the slide 131 is at its downward limit, the end 134 engages the top of the valve 124 and moves it downwardly to the position shown in Figure 3. The pressure from the pump 121 is therefore, intermittently only in communication with the cylinder 118, and that only during the cutting stroke of the saw. When the valve 113 has been moved downwardly to permit the fluid contained in the top of the cylinder to escape, as above described, the circumferential groove 113' is brought into register with the conduit 135 (see Fig. 7) so that the pressure from the pump 121, through the pipes 127 and 116, is now transferred to the lower end of the cylinder under the piston, and as the pressure under the piston raises the piston, the contained water is forced out through the conduit 112 to escape through the pipe 120, as above noted.

Figure 8:
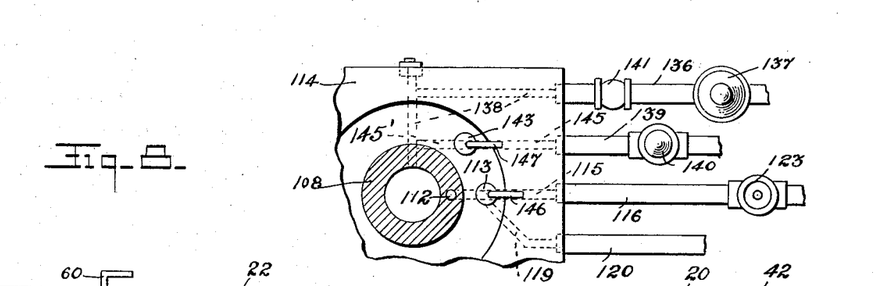
Figure 8 is an enlarged detail view of the feeding mechanism, taken substantially on the same plane as the corresponding parts in Figure 4.
Figure 12:
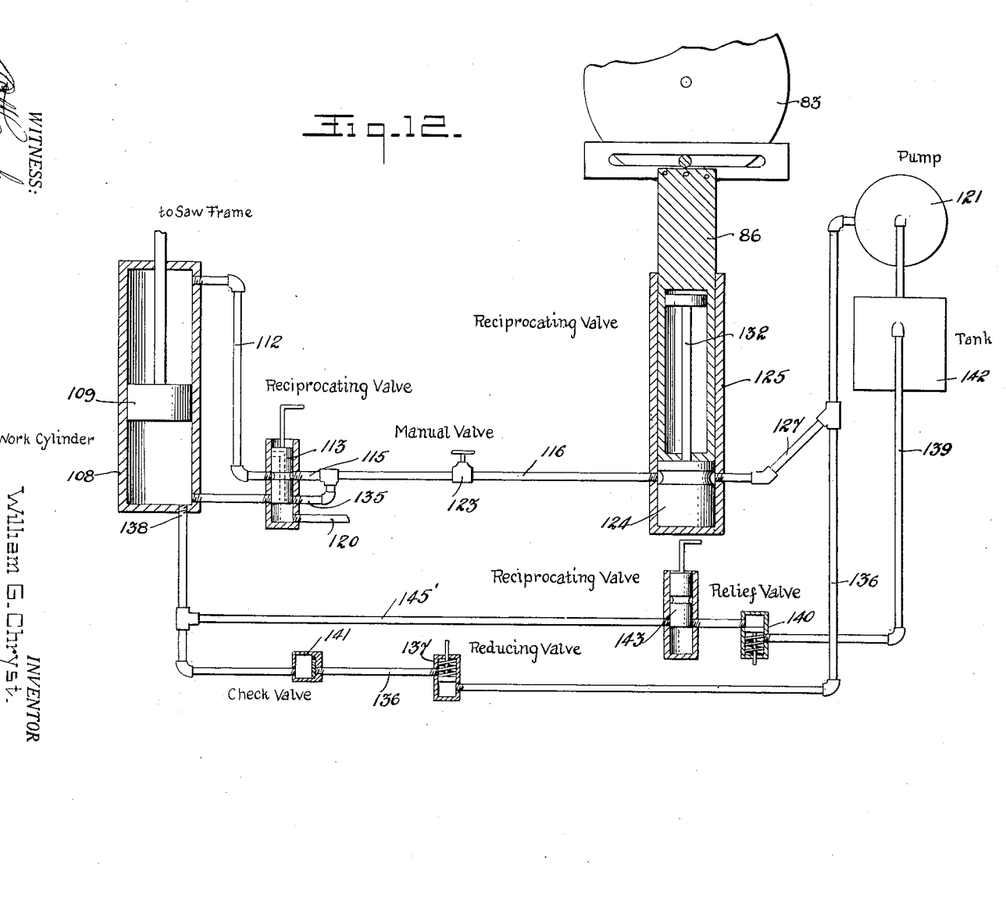
Figure 12 is a diagrammatic view of the hydraulic system of controlling the several mechanisms.

During the time that pressure is applied to the top of the piston, for the purpose of feeding the saw to its work, pressure is likewise applied to the bottom of the piston through the pipe 136. This pipe however, is provided with a reducing valve 137 so that the pressure on the under side of the piston is radically less than that on the top of the piston. Communication between the pipe 136 and the cylinder, is shown more particularly at Figure 8, and comprises the L-shaped passage 138, shown therein in dotted lines. Communicating also with the bottom of the cylinder, is a relief pipe 139, having a relief valve 140, preferably set to maintain the required pressure. The reducing valve 137, and the relief valve 140, are well known types of valves, and are not per se novel in the present invention and a description thereof, is deemed unnecessary. The pipe 136 also takes pressure from the pump 121, but is reduced as above noted. A check valve 141 is employed to prevent back flow at any time through the pipe 136. The relief pipe 139 may discharge to any convenient receptacle, but is shown as returned to the tank 142 from which the pump 121 takes its fluid.

The return flow to the tank 142, through the pipe 139, is controlled by a manual valve 143. (See Figs. 8 and 10). This valve 143, is provided with a circumferential groove 144, which is, at times, in communication between the sections 145 and 145' of the conduit formed in the base 114 of the cylinder 108, and an axial passage 144' is provided merely to prevent suction. The valves 113 and 144 are provided with upstanding stems 146 and 147 respectively, and at Figure 4, a lever 148 is shown for manually actuating both of these valves simultaneously.

The cylinder 108 is positioned between a front plate 149, and a rear plate 150, which said plates are provided with slots 151 in which slide lugs 152, carried by the tracks 73, to further assist in stabilizing these tracks and insure continual horizontality.

During the cutting stroke of the saw, in the direction indicated by the arrow at Figure 1, it is desirable that the saw frame and the saw itself, shall move slowly, whereas upon the return stroke, it is desirable that the parts shall return quickly. To insure this action, the pulley 43, which is mounted to rotate upon the shaft 42, has rigidly and concentrically connected therewith, a gear wheel 153. This gear 153 is intergeared with the gear 154 upon a stub shaft 155, carried by the upright structure 41. Eccentrically connected with the gear 154, is a gear 156, intergeared with a gear 157, eccentrically mounted upon the shaft 42 and keyed thereto as indicated at Figure 11.

During one-half of the revolution of the pulley 43 therefore, the shaft 155 will rotate at a speed greater than the rotation of the pulley, and at the other half of the rotation, will rotate at a speed less than the pulley. These gears are so arranged that when the power is transmitted to the disk 83, and to the parts reciprocating the saw, the saw frame moves slowly in the direction indicated by the arrow, and rapidly in the reverse direction.

In operation, with the parts associated as shown in the drawings, power applied at the motor 56 will be transmitted through the gears 58 and 59 to the cone 52, by the belt 61 to the cone 51, from the pulley 45, by the belt 44, to the pulley 43. Through the medium of the eccentric gear motion hereinbefore described, the shaft 42 will be rotated, and therewith, the disk 83. The wrist pin 84, of the disk 83, will reciprocate the slide 86 vertically. The pin 88, engaging the lever 90, will rock the shaft 91 to oscillate the arm 92, which through its connection with the rod 100, will reciprocate the saw frame with the saw 74 in position to operate upon the work indicated at 25.

Simultaneously, the pump 121 is actuated by the motor 122, and pressure upon the top of the piston 109, will force the parts, including the track and saw frame, downwardly to tension the saw 74 upon the work. As has been explained, however, there is a counter passage below the piston 109. The pressure above the piston 109 is controlled by the valve 124 and is applied to the cylinder through that valve only during the cutting stroke of the saw, which is in the direction indicated by the arrow at Figure 1.

At the return stroke, the valve 124 is raised and the pressure is interrupted upon the top of the piston 109, but the lesser pressure upon the bottom of the piston is maintained. The fluid above the piston and in the various parts, and the parts themselves, will yield sufficiently to raise the piston, and the saw equipment, an almost imperceptible amount during the return stroke so that the saw will not drag on the work during such return stroke. It is the intent that the pressure beneath the piston shall be adequate to lift the saw frame, and its equipment, with a slight margin of excess to overcome the resistance of the fluid pressure at the top of the piston. It should be emphasized, that the lifting of the saw is not intended to lift the saw out of the work, or even lift it clear of the cut, but only sufficiently to merely ease it on its return movement and prevent wear and breakage of the saw when not cutting.

The various parts are shown in the drawings adjusted to provide a cut for substantially the maximum size work to which the machine is adapted. When a smaller work is to be operated upon, it is obvious that the vise jaws 23 and 24, will be so adjusted as to occupy positions nearer to each other to clamp the smaller work. This adjustment, while closing jaws with sufficient force to clamp the work, will also through the medium of the threaded section 36, move the plate 38 toward the vise. This movement of the plate 38 toward the vise, will cause the pin 88 to slide in the slot 89, of the lever 90.

The nearer the pin approaches to the fulcrum, that is to say, the shaft 91, the greater will be the amplitude of oscillation of the lever 90 and therewith, the lever 92, and consequently, greater will be the travel of the saw frame. This is for the purpose of employing at all times, irrespective of the size of the work, the entire cutting capacity of the saw, so that the operation will not only be performed more quickly, but will wear the saw evenly at all points, at all times.

Also, when smaller work is being operated upon, the saw will preferably travel more rapidly that is a greater number of reciprocations per minute, both in its cutting and return stroke. This is brought about by the same movement which moves the plate 38, moving the nut 37, and therewith, the arm made up of sections 68 and 69, actuating the bell crank lever 63 to ship the belt on the cones 52 and 51. As shown at Figure 4, the belt is on the smaller end of the driving cone, and the larger end of the driven cone, whereby, the rotation of the driven cone 51 is at its minimum. As the belt is shipped toward the larger end of the driving cone 52 and the smaller end of the driven cone 51, it is obvious that the cone 51 and the parts driven therefrom, will be speeded up relative to the rotation of the driving cone 52 and the tempo of reciprocation of the saw and frame be increased.

The manually controlled stepped gears 58 and 59, are merely employed as the hardness or resistance of the work changes. When the work is hard, as for instance, hard steel, the stepped gears are manipulated to drive the entire device slowly; but when for instance the work is soft iron, the gears will be manipulated to provide the maximum speed, with of course, the intermediate speed to be employed as required.

In any instance, the pressure upon the piston 109 will force the saw frame and its supporting parts, downwardly, the pressure being principally transmitted through the rod 105, and the saw frame at all times maintained in perfectly plumb position by its bearing upon the tracks 73. The saw will continue to reciprocate, and the supporting structure continue to move downwardly intermittently until the limit of the work has been reached. At this point, the lugs 152, or adjacent parts, will engage upon the tops of the valves 113 and 143 and force these valves downwardly so that the introduction of actuating fluid to the top of the cylinder is discontinued and permitted to waste through the central bore 117 of the valve 113, simultaneously applying fluid pressure through the conduit 135 to the bottom of the piston, will raise the saw frame and its associated parts. The pressure previously maintained in the cylinder beneath the piston, will be interrupted by the greater pressure admitted below the piston and the back pressure of this greater pressure, will be held by the check valve 141.

When the piston and the parts carried thereby have reached the top, that is to say, a position shown at Figure 1, the engagement of the lugs 152 with the tops of the slots 151, will prevent further movement, and while the pressure will continue upon the bottom of the piston, no further action will result. When the work has again been placed in position, the valves 113 and 143 are manually raised, whereupon, the pressure below the piston will again be reduced to its normal working pressure, and the pressure above the piston again built up to working pressure, and the device will thereupon automatically continue its function for a complete cycle of operation.

In other words, the only manual activity required, is the placing of the work in the vise, closing the jaws of the vise, and lifting the valves 113 and 143, by the lever 148 and the machine, automatically adjusts itself, both to the amplitude of travel of the saw, and the speed of travel, in accordance with the work presented, and continues such operation until such cut has been completed, then automatically raises itself to intial position and stops.

Of course, the hack saw machine, herein illustrated may be modified in various ways without departing from the invention herein set forth and hereinafter claimed.

The invention is hereby claimed as follows:

1. A hack saw machine comprising work holding jaws, a saw frame, means to reciprocate the frame, and means affected by the positioning of the jaws controlling the tempo of reciprocation of the frame.

2. A hack saw machine comprising work holding jaws, a reciprocating saw frame, driving means moving at a uniform speed, and means connecting the saw frame with the driving means and affected by the positioning of the jaws to vary the tempo of reciprocation of the saw frame relative to the driving means.

3. A hack saw machine comprising work holding jaws, means to adjust the jaws to work of varying sizes, a reciprocating saw frame, driving means moving at a uniform rate, and an organization effecting the clamping movement of the jaws and varying the amplitude and tempo of reciprocation of the saw frame inversely as the size of the work.

4. A hack saw machine comprising sliding work holding jaws, a saw frame reciprocating adjacent the jaws, a driving means moving at a uniform rate, an organization connecting the driving means with and to reciprocate the saw frame, and means effecting the sliding of the jaws and the connecting organization to reciprocate the saw at a more rapid tempo as the jaws approach each other.

5. A hack saw machine comprising a table, work holding jaws mounted to slide upon the table, means to actuate the jaws for clamping, a saw frame reciprocating adjacent the jaws, a prime mover, means to reciprocate the saw frame, an organization connecting the prime mover with the reciprocating mechanism, and means actuating the movement of the jaws, said last mentioned means varying the tempo of reciprocation of the frame relative to the prime mover.

6. A hack saw machine comprising a table, work holding jaws mounted to slide upon the table, manual means for sliding the jaws to work clamping position, a saw frame mounted to reciprocate adjacent the jaws, a prime mover, a driving mechanism for the saw frame, a power transmission organization from the prime mover to the driving mechanism, and means actuated by the manipulation of the jaw sliding means to vary the tempo of the driving mechanism relative to the prime mover.

7. A hack saw machine comprising a table, work clamping jaws mounted to slide upon the table, manual means for adjusting the jaws to work clamping positions, a saw frame mounted to reciprocate adjacent the jaws, a prime mover, cones journaled adjacent each other in inverted relation, means connecting the prime mover to drive one of said cones, a belt interconnecting the cones, a belt shipper, and means connecting the jaw clamping mechanism with the belt shipper to ship said belt from the smaller to the larger end of the driving cone as the jaws approach each other.

8. A hack saw machine comprising a table, jaws mounted to slide upon the table, means to adjust the jaws to work clamping positions, a hack saw frame mounted to reciprocate adjacent the jaws, cones journaled adjacent each other in reversed relation, a prime mover connected to drive one of said cones, means connecting the other cone with the saw frame to reciprocate said frame, a belt interconnecting the cones, a belt shipper for controlling the position of the belt, a bell crank lever carrying said belt shipper, and means connecting the jaw adjusting mechanism with the bell crank lever to move the belt shipper to ship the belt from the smaller toward the larger end of the driving cone as the jaws approach each other.

9. A hack saw machine embodying a work table, a saw frame, a supporting structure for the saw frame, reciprocating means for the frame, a cylinder, means including said cylinder to guide the saw frame, a piston mounted in the cylinder and supporting the frame supporting structure, means to supply fluid pressure for the top of the piston to force the saw to its work, means controlled from the reciprocating means to control the fluid pressure, means to maintain a counter balancing pressure, means beneath the piston, and means at the lower limit of movement of the piston to automatically reverse the pressure from the top to the bottom of the piston.

10. A hack saw machine comprising a work table, a saw frame provided with rollers mounted to reciprocate adjacent the table, means to reciprocate the frame, a supporting structure for the saw frame including tracks for the rollers, a cylinder, a piston mounted in the cylinder and connected with the supporting structure, means to introduce fluid under pressure at the top of the cylinder, and on the top of the piston, means actuated from the reciprocating means to interrupt the pressure at each reciprocation, means to introduce fluid under lesser pressure at the bottom of the cylinder under the piston, means at the lower limit of movement of the supporting structure to automatically reverse the application of the high pressure fluid, and manual means for restoring the relative pressures.

11. A hack saw machine comprising a work table, a saw frame mounted to reciprocate adjacent the table, a supporting guide for the saw frame, a cylinder, means to maintain the horizontality of the guide, a piston in the cylinder connected with the supporting structure, means to supply fluid under pressure to the top of the piston to feed the frame downwardly, means to supply fluid under lesser pressure beneath the piston, means to reciprocate the saw frame, and means actuated by the reciprocating mechanism to interrupt the pressure upon the top of the piston at each reciprocation, the while maintaining the lesser pressure beneath the piston.

12. A hack saw machine comprising a work table, a saw frame mounted to reciprocate adjacent the table, a supporting structure maintaining constant horizontality of the reciprocating frame, a cylinder, a piston mounted in the cylinder and connected with the supporting structure, a source of fluid under pressure connected with the top of the cylinder, means connecting said source with the cylinder beneath the piston, a reducing valve introduced into said last mentioned means, a sliding valve controlling the pressure to the top of the cylinder, means to reciprocate the saw frame, and means for connecting the reciprocating means with the sliding valve to reciprocate said valve in consonance with the reciprocation of the saw frame.

13. In a hack saw machine, a work holder, a saw frame movable adjacent to the work holder, means to reciprocate the saw frame, means actuated by the work holder operating means to vary the tempo of reciprocation, means to feed the saw frame vertically, and means to maintain the horizontality of the frame.

14. A hack saw machine comprising in combination, manually adjustable jaws, laterally spaced parallel V-shaped guides below and extending longitudinally upon opposite sides of the jaws, a saw frame, rollers carried by the saw frame provided with V-shaped grooves mounted for movement upon the guides, means to hold the frame operatively to the guides, means to feed the guides downwardly, and means to reciprocate the saw frame.

15. A hack saw machine comprising in combination, manually adjustable work holding jaws, a saw frame mounted to reciprocate relative to the jaws, a driving part, means transmitting movement from the driving part to move the saw frame, a tempo change organization introduced into the transmitting means, and means controlled by the adjustment of the jaws automatically affecting the tempo change organization.

16. A hack saw machine comprising in combination, manually adjustable work holding jaws, a saw frame mounted to reciprocate relative to the jaws, a driving part, means transmitting movement from the driving part to move the saw frame, a change speed organization introduced into the transmitting means, said change speed organization including reversely arranged cones, a belt and belt-shipper, and means controlled by the adjustment of the jaws automatically affecting the change speed organization.

17. A hack saw machine comprising in combination, manually adjustable work holding jaws, a saw frame mounted to reciprocate relative to the jaws, a driving part, means transmitting movement from the driving part to move the saw frame, a change speed organization introduced into the transmitting means, said change speed organization including reversely arranged cones, a belt and belt-shipper, said belt displaying one surface upon one cone and the opposite surface upon the other cone, and means controlled by the adjustment of the jaws automatically affecting the change speed organization.

18. A hack saw machine comprising in combination, manually adjustable work holding jaws, a saw frame mounted to reciprocate relative to the jaws, a driving part, means transmitting movement from the driving part to move the saw frame, a change speed organization introduced into the transmitting means, said change speed organization including reversely arranged cones, a belt and belt-shipper, and means controlled by the adjustment of the jaws automatically affecting the belt-shipper of the change speed organization.

WILLIAM G. CHRYST.